US010640026B2

(12) United States Patent
Hasegawa et al.

(10) Patent No.: US 10,640,026 B2
(45) Date of Patent: May 5, 2020

(54) VEHICLE SEAT

(71) Applicants: TACHI-S CO., LTD., Tokyo (JP); HONDA MOTOR CO., LTD., Tokyo (JP)

(72) Inventors: Yousuke Hasegawa, Tokyo (JP); Sigeyuki Okamoto, Tokyo (JP); Hiroyuki Yajima, Tokyo (JP); Shogo Wakana, Tokyo (JP); Osamu Kyogoku, Saitama (JP); Sugiaki Yamazato, Saitama (JP); Toru Inagaki, Saitama (JP)

(73) Assignees: TACHI-S CO., LTD., Tokyo (JP); HONDA MOTOR CO., LTD., Tokyo (JP)

(*) Notice: Subject to any disclaimer, the term of this patent is extended or adjusted under 35 U.S.C. 154(b) by 46 days.

(21) Appl. No.: 16/139,894

(22) Filed: Sep. 24, 2018

(65) Prior Publication Data
US 2019/0092202 A1 Mar. 28, 2019

(30) Foreign Application Priority Data

Sep. 25, 2017 (JP) .................................. 2017-184020

(51) Int. Cl.
B60N 2/42 (2006.01)
B60N 2/68 (2006.01)
B60N 2/20 (2006.01)
B60N 2/22 (2006.01)
B60R 22/18 (2006.01)
(Continued)

(52) U.S. Cl.
CPC ............... *B60N 2/688* (2013.01); *B60N 2/20* (2013.01); *B60N 2/22* (2013.01); *B60N 2/682* (2013.01); *B60R 22/26* (2013.01); *B60R 22/36* (2013.01); *B60R 2022/1818* (2013.01)

(58) Field of Classification Search
CPC .......... B60N 2/682; B60N 2/688; B60N 2/68; B60N 2/22; B60N 2002/684; B60R 22/26
See application file for complete search history.

(56) References Cited

U.S. PATENT DOCUMENTS 4,575,153 A * 3/1986 Aoki ........................ B60N 2/68
248/188.91
5,660,443 A * 8/1997 Pedronno ............... B60N 2/682
297/410

(Continued)

FOREIGN PATENT DOCUMENTS

JP 2005-067331 A 3/2005
JP 2013-193586 A 9/2013

*Primary Examiner* — Shin H Kim
(74) *Attorney, Agent, or Firm* — Paratus Law Group, PLLC

(57) ABSTRACT

A vehicle seat includes: a seat back, connected with a seat cushion through a recliner, an outlet of a shoulder belt being provided in one shoulder of the seat back, wherein: the seat back includes: a first side frame, arranged on the one shoulder side; and a second side frame, arranged on the other shoulder side; the first side frame includes: a first frame member having a hollow and closed sectional shape; and a plate-shaped bracket which is attached in the recliner; and the bracket includes a joint part which is inserted into a lower end portion of the first frame member and is joined with the lower end portion.

6 Claims, 6 Drawing Sheets

(51) Int. Cl.
 *B60R 22/26* (2006.01)
 *B60R 22/36* (2006.01)

(56) References Cited

U.S. PATENT DOCUMENTS

| | | | | |
|---|---|---|---|---|
| 7,677,669 B2 * | 3/2010 | Blankart | ................ | B60N 2/682 |
| | | | | 297/452.18 |
| 8,061,779 B2 * | 11/2011 | Nakagaki | ............... | B60N 2/686 |
| | | | | 297/440.2 |
| 8,267,479 B2 * | 9/2012 | Yamada | .................. | B60N 2/22 |
| | | | | 297/452.18 |
| 8,888,191 B2 * | 11/2014 | Hosokawa | ............... | B60N 2/22 |
| | | | | 297/452.18 |
| 10,059,236 B2 * | 8/2018 | Akaike | .................. | B60N 2/682 |
| 10,124,701 B2 * | 11/2018 | Mizobata | .................. | B60N 2/682 |
| 10,144,325 B2 * | 12/2018 | Akaike | .................. | B60N 2/682 |
| 10,414,307 B2 * | 9/2019 | Suzuki | ................... | B60N 2/688 |
| 2007/0210638 A1 * | 9/2007 | Adragna | ................. | B60N 2/68 |
| | | | | 297/452.2 |
| 2013/0140868 A1 * | 6/2013 | Muck | ..................... | B23K 26/24 |
| | | | | 297/452.2 |
| 2013/0221725 A1 * | 8/2013 | Yamada | ................. | B60N 2/682 |
| | | | | 297/452.18 |
| 2013/0249267 A1 | 9/2013 | Hosokawa | | |
| 2018/0126883 A1 * | 5/2018 | Sakaguchi | ........... | B60N 2/0232 |
| 2018/0334060 A1 * | 11/2018 | Yamabe | ................... | B60N 2/68 |
| 2019/0210497 A1 * | 7/2019 | Baba | ..................... | B60N 2/427 |

* cited by examiner

VEHICLE SEAT

CROSS-REFERENCE TO RELATED APPLICATION(S)

This application is based upon and claims the benefit of priority from Japanese Patent Application No. 2017-184020, filed on Sep. 25, 2017, the entire contents of which are incorporated herein by reference.

BACKGROUND

1. Field of the Invention

The present invention relates to a vehicle seat.

2. Description of the Related Art

A so-called belt-in seat in which a retractor of a shoulder belt is embedded is known as a seat which is mounted in a vehicle such as an automobile. In the belt-in seat, an outlet of the shoulder belt is provided in one shoulder of a seat back, and a belt guide which guides the shoulder belt to the outlet is supported by a side frame which is arranged on one shoulder side on which the outlet is provided.

The shoulder belt is locked by the retractor at the time of vehicle collision, for example, and an upper body of an occupant is restrained by the locked shoulder belt.

However, at that time, a relatively large load is applied to the side frame which supports the belt guide. The load is applied such that the side frame is bent and twisted to the front side of the seat.

As for the load, a seat is known which uses a frame member having a hollow and closed cross sectional shape in the side frame so as to improve the frame strength. A plate-shaped recliner-mounting bracket which is thicker than the frame member is joined in the lower end portion of the frame member, and the side frame is supported in the recliner through the bracket (for example, see JP-A-2005-67331 and JP-A-2013-193586).

In the seat described in JP-A-2005-67331, the bracket is overlapped with the side wall on the outer side (the opposite side to the other side frame side) in the outer portion of the frame member. The recliner is overlapped with the side surface of the bracket on the outer side. In this case, there is a concern that the recliner serving as the support point of the side frame is separated from the side frame in the width direction so that the strength with respect to the twisting is reduced.

In the seat described in JP-A-2013-193586, the bracket is overlapped with the side wall on the inner side (other side frame side) in the outer portion of the frame member, and the recliner is overlapped with the side surface of the bracket on the outer side. In this case, the recliner is arranged substantially just below the frame member, so as to prevent the reduction of the strength with respect to the twist.

However, in the seat described in JP-A-2005-67331 and the seat described in JP-A-2013-193586, commonly, the bracket is arranged in the outer portion of the frame member. For this reason, since the size of the bracket is enlarged, and combined with the fact that the bracket is a thick plate, reduction in weight is inhibited.

SUMMARY

The invention is made in consideration of the above situation, and an object thereof is to provide a vehicle seat in which frame strength can be improved and weight can be reduced.

According to an aspect of the invention, there is provided a vehicle seat including: a seat back, connected with a seat cushion through a recliner, an outlet of a shoulder belt being provided in one shoulder of the seat back, wherein: the seat back includes: a first side frame, arranged on the one shoulder side; and a second side frame, arranged on the other shoulder side; the first side frame includes: a first frame member having a hollow and closed sectional shape; and a plate-shaped bracket which is attached in the recliner; and the bracket includes a joint part which is inserted into a lower end portion of the first frame member and is joined with the lower end portion.

According to the aspect of the invention, it is possible to provide the vehicle seat in which the frame strength can be improved and the weight can be reduced.

DETAILED DESCRIPTION OF THE INVENTION

Figure 1:
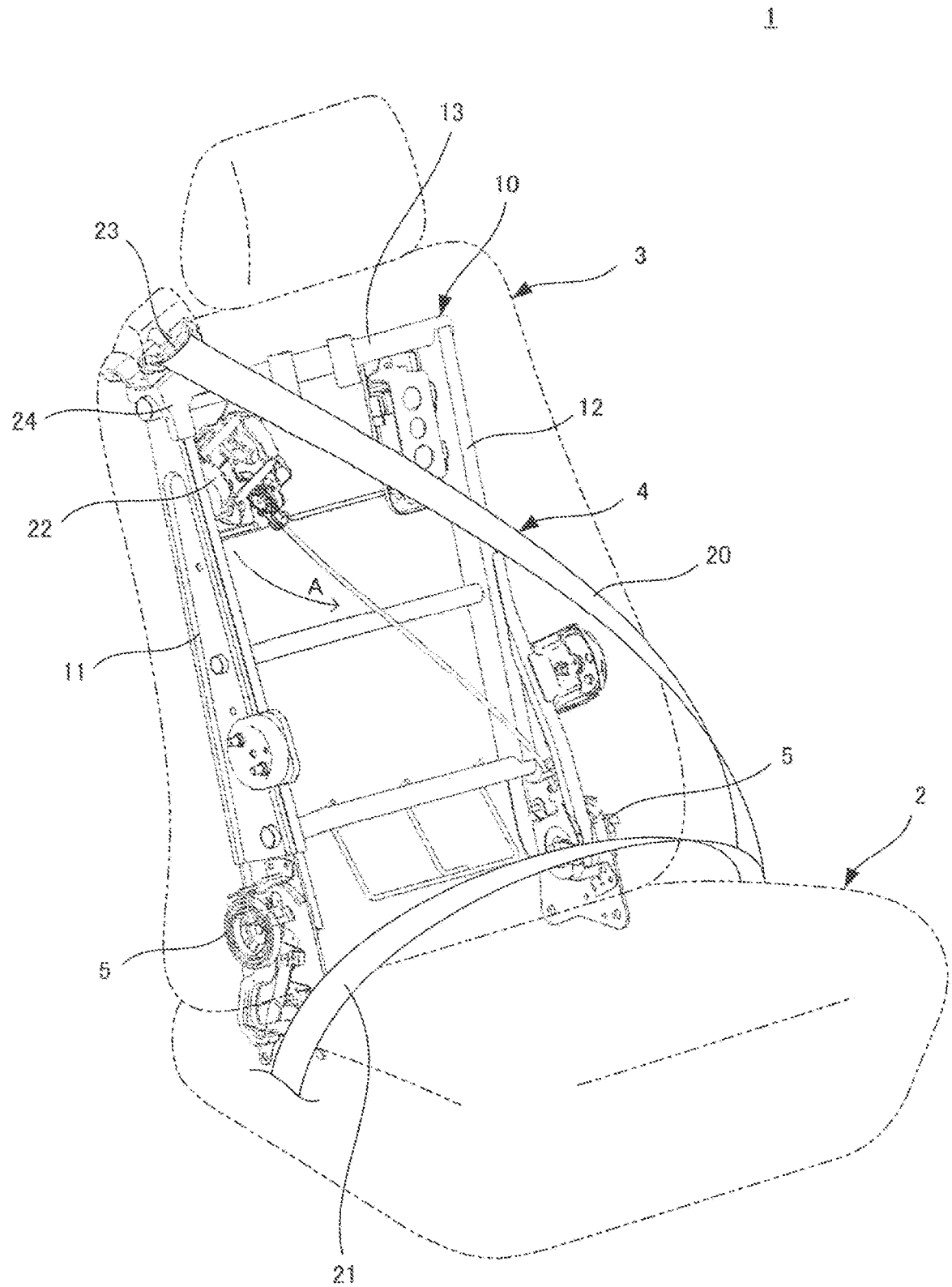
FIG. 1 is a perspective view of one example of a vehicle seat for describing an embodiment of the invention.

FIG. 1 is a perspective view illustrating one example of a vehicle seat for describing an embodiment of the invention.

A seat 1 illustrated in FIG. 1 is a vehicle seat mounted in a vehicle such as an automobile, and includes a seat cushion 2 which supports a hip part and a thigh part of an occupant sitting on the seat 1, a seat back 3 which supports a lumbar part and a back part of the occupant, and a seat belt 4 for restraining the occupant in the seat cushion 2 and the seat back 3.

The seat back 3 includes a back frame 10 forming a frame of the seat back 3. The back frame 10 includes a pair of back side frames 11 and 12 which are arranged with a gap in a seat width direction and extend in a seat vertical direction, and an upper frame 13 which connects the respective upper end portions of the pair of back side frames 11 and 12 to each other. The back frame 10 is covered with a cushion pad which is made of a relatively soft foam resin material such as urethane foam, and further with a trim cover which is made of skin material such as leather, woven fabric, and non-woven fabric.

Although not illustrated, the seat cushion 2 includes a cushion frame forming a frame of the seat cushion 2. The cushion frame includes a pair of cushion side frames which are arranged with a gap in the seat width direction and extend in a seat front/rear direction. Further, similarly to the back frame 10 of the seat back 3, the cushion frame is also covered with a cushion pad and a trim cover.

The lower end portion of the back side frame 11 is connected with the cushion side frame on the same side through the recliner 5. The back side frame 12 is also connected with the cushion side frame on the same side through the recliner 5. The seat back 3 is tiltable with respect to the seat cushion 2 in the seat front/rear direction and is held by an adjusted tilt angle by the recliner 5.

The seat belt 4 is a so-called three point type seat belt. The seat belt includes a shoulder belt 20 which is laid obliquely from one shoulder (in the illustrated example, the right shoulder) among right and left shoulders of the occupant sitting on the seat 1 to the lumbar part, and a lap belt 21 which is wound continuously from the shoulder belt 20 to the lumbar part of the occupant. Further, a retractor 22 which winds the shoulder belt 20 and the lap belt 21 is embedded into the seat back 3, and the retractor 22 is fixed in the upper frame 13.

The retractor 22 is a so-called emergency locking retractor. The retractor is configured to stop the shoulder belt 20 being sent out, for example, in a case where a drastic deceleration occurs due to a vehicle collision or the like. Incidentally, the retractor 22 may have a function of a so-called pretensioner which automatically winds the shoulder belt 20 in the case of a drastic deceleration or the like so as to actively restrain the occupant. In addition, the retractor 22 may have a function of a so-called force limiter which sends out the shoulder belt 20 gradually to loosen the restraining of the occupant when an excessive tensile load acts on the shoulder belt 20.

An outlet 23 of the shoulder belt 20 is provided in one shoulder of the seat back 3 which supports the right shoulder of the occupant. A belt guide 24 which guides the shoulder belt 20 sent out from the retractor 22 to the outlet 23 is attached in the upper end portion of the back side frame (first side frame) 11 which is arranged on the shoulder side on which the outlet 23 is provided.

In a case where a drastic deceleration occurs due to the vehicle collision or the like, the shoulder belt 20 is locked by the retractor 22. When the upper body of the occupant is restrained by the locked shoulder belt 20, the load is applied to the back side frame 11 in which the belt guide 24 is attached. As indicated by arrow A in the drawing, the load is applied such that the back side frame 11 is bent and twisted to the seat front side.

FIGS. 2 to 6 illustrate the configuration of the back frame 10.

Figure 2:
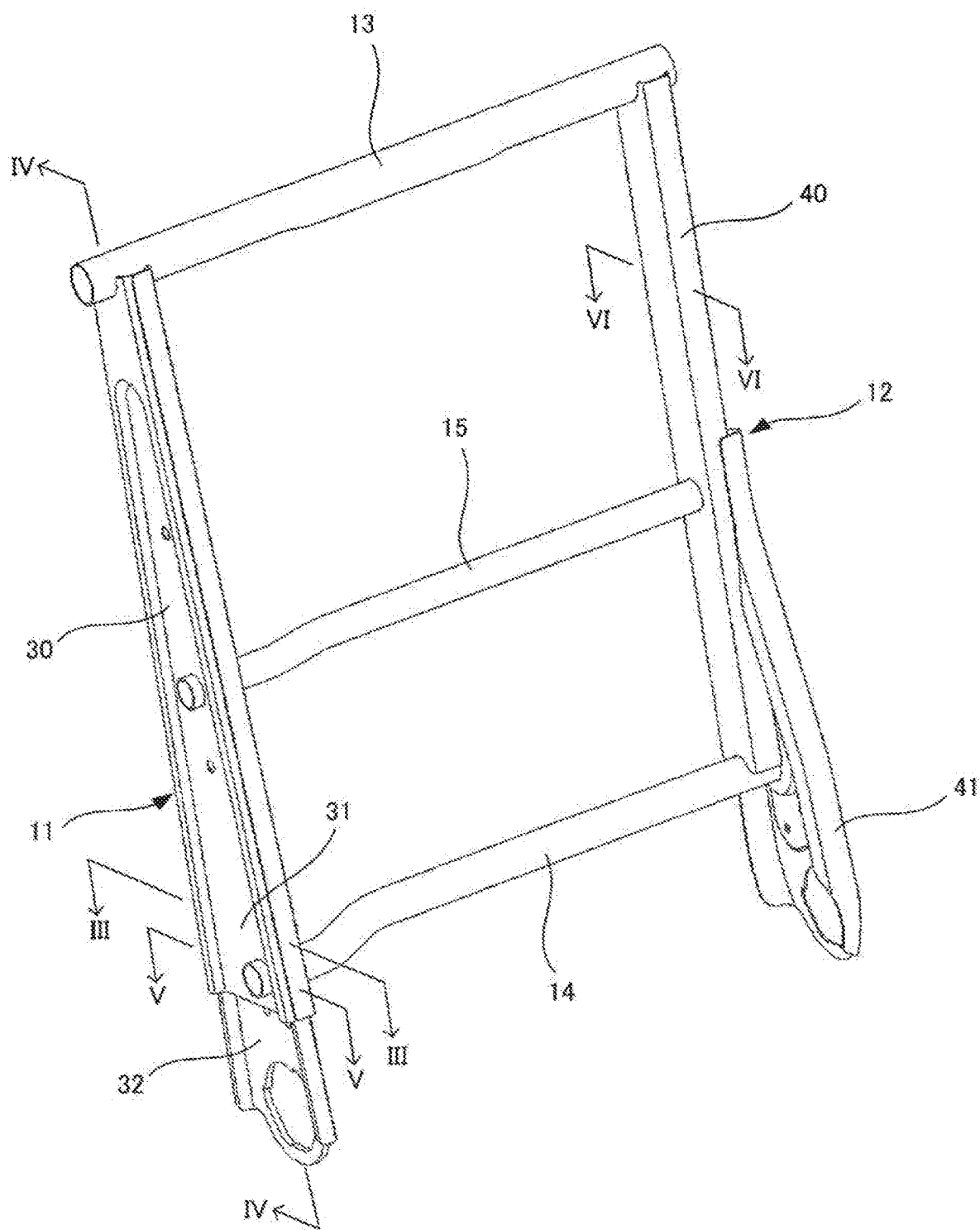
FIG. 2 is a perspective view of a back frame of the vehicle seat of FIG. 1.

As illustrated in FIG. 2, the back frame 10 includes one or more reinforcing member which connects the pair of back side frames 11 and 12, as well as the upper frame 13 which connects the respective upper end portions of the pair of back side frames 11 and 12 to each other. In this example, the back frame includes a first reinforcing member 14 which connects the respective lower end portions of the pair of back side frames 11 and 12 to each other, and a second reinforcing member 15 which connects the respective intermediate portions of the pair of back side frames 11 and 12 to each other.

One back side frame (first side frame) 11 which is arranged on the shoulder side on which the outlet 23 (see FIG. 1) is provided includes a first frame member 30 having a hollow and closed cross sectional shape, and a plate-shaped first bracket 32 which is joined with a lower end portion 31 of the first frame member 30 to be attached in the recliner 5 (see FIG. 1). The other back side frame (second side frame) 12 includes a second frame member 40 having a hollow and closed cross sectional shape, and a plate-shaped second bracket 41 which is joined with the lower end portion of the second frame member 40 to be attached in the recliner 5.

Figure 3:
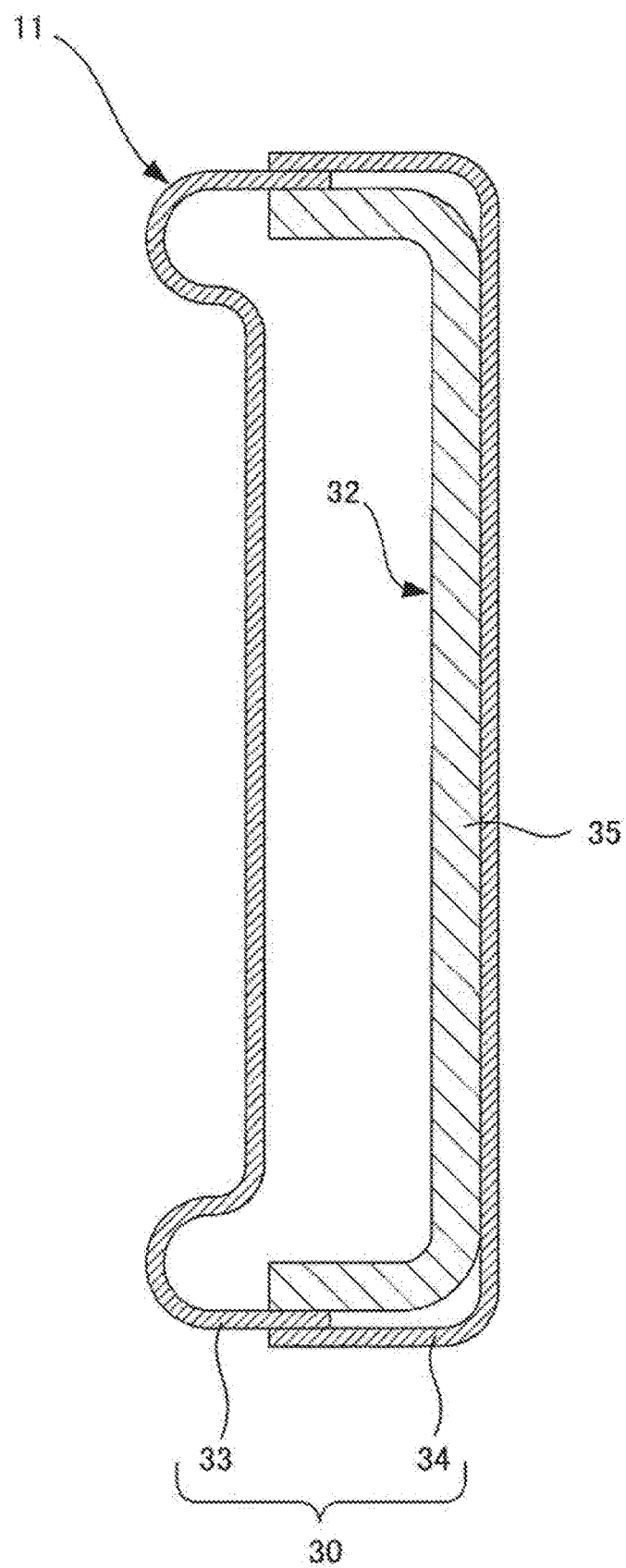
FIG. 3 is a sectional view taken along line III-III of FIG. 2.

As illustrated in FIG. 3, the first frame member 30 of the back side frame 11 includes an outer plate 33 which is arranged on the opposite side to the other back side frame 12 side, and an inner plate 34 which is arranged on the back side frame 12 side.

The outer plate 33 is formed such that the cross section perpendicular to the seat vertical direction is a hollow and open cross sectional shape having an almost U shape. The inner plate 34 is also formed such that the cross section perpendicular to the seat vertical direction is a hollow and open cross sectional shape having an almost U shape. Further, the hollow portion of the outer plate 33 and the hollow portion of the inner plate 34 are made to face each other, and the outer plate 33 and the inner plate 34 are joined to each other. Accordingly, the first frame member 30 is formed in a hollow and closed sectional shape. The method of joining the outer plate 33 and the inner plate 34 can be exemplified by welding, brazing, and the like.

The first bracket 32, which is joined in the lower end portion 31 of the first frame member 30, is a member which receives the load applied to the back side frame 11. The first bracket 32 is made of a plate material thicker than the outer plate 33 and the inner plate 34. In terms of the improvement of the strength, similarly to the outer plate 33 and the inner plate 34, the first bracket 32 is formed such that the cross section perpendicular to the seat vertical direction is a hollow and open cross sectional shape having an almost U shape.

The first bracket 32 includes a joint part 35 which is joined with the lower end portion 31 of the first frame member 30. The joint part 35 is inserted into the lower end portion 31 of the first frame member 30 formed in a hollow and closed sectional shape and is joined with the lower end portion 31. The method of joining the lower end portion 31 of the first frame member 30 and the joint part 35 of the first bracket 32 can be exemplified by welding, brazing, and the like.

The joint part 35 of the relatively thick first bracket 32 is inserted into the lower end portion 31 of the first frame member 30, and thus the first bracket 32 is reduced in size and weight compared to a case where the joint part 35 is arranged in the outer portion of the lower end portion 31. Accordingly, the seat 1 can be reduced in weight.

Figure 4:
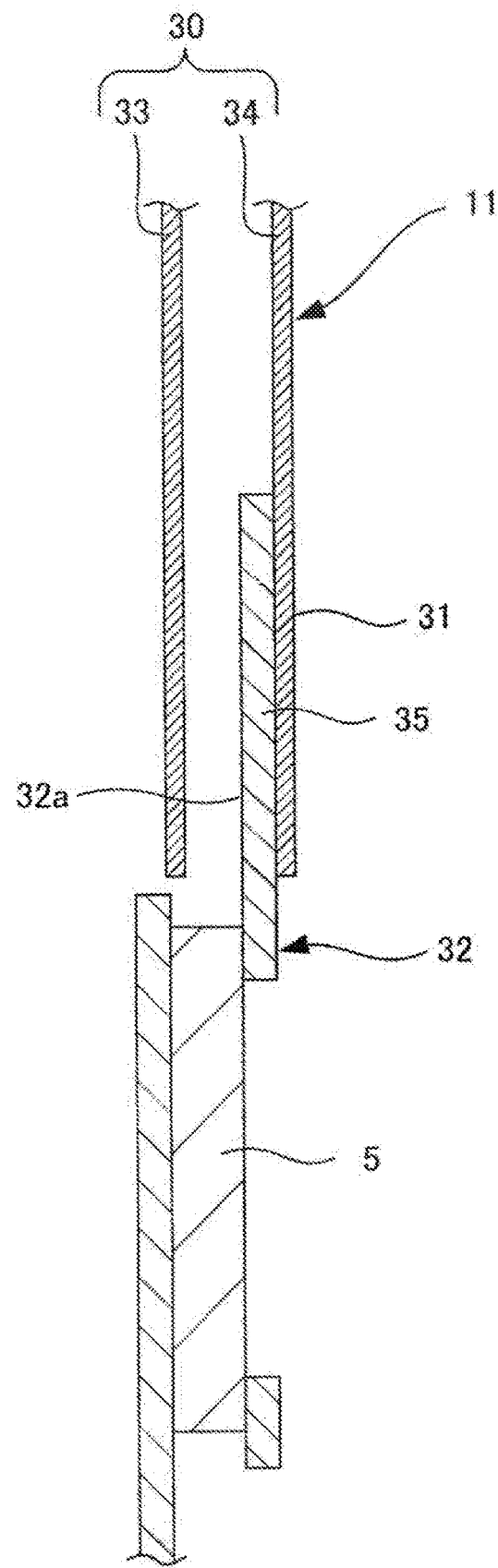
FIG. 4 is a sectional view taken along line IV-IV of FIG. 2.

Preferably, as illustrated in FIGS. 3 and 4, the joint part 35 of the first bracket 32 is joined with the lower end portion 31 of the first frame member 30 along the inner plate 34, and the recliner 5 is attached in the side surface 32a of the first bracket 32 on the opposite side to the inner plate 34 side. In this case, the recliner 5 serving as a support point of the back side frame 11 is arranged substantially just below the back side frame 11. Accordingly, the strength of the back side frame 11 can be improved with respect to the twisting caused by the load applied to the back side frame 11. In addition, the protruding of the recliner in the seat width direction is inhibited, thereby contributing to the miniaturization of the seat 1.

With reference to FIG. 2, the back side frame 11 is connected with the back side frame 12 through the first reinforcing member 14 and the second reinforcing member 15, and the load applied to the back side frame 11 is dispersed to the back side frame 12 through the first reinforcing member 14 and the second reinforcing member 15. Accordingly, the bending and the twisting of the back side frame 11 caused by the load are inhibited.

Figure 5:
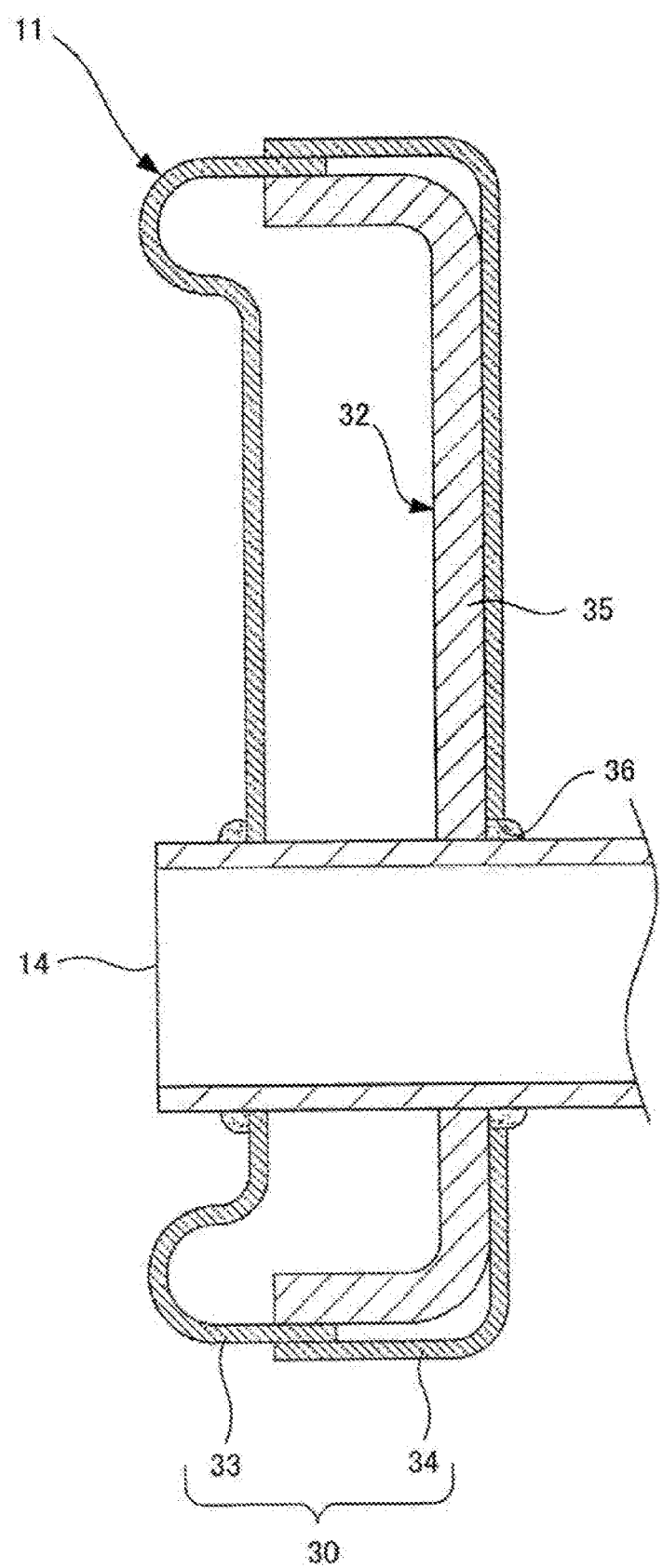
FIG. 5 is a sectional view taken along line V-V of FIG. 2.

The end portion on the back side frame 11 side, which is connected with the intermediate portion of the back side frame 11, of the second reinforcing member 15 is joined with the first frame member 30. With respect thereto, as illustrated in FIG. 5, the end portion on the back side frame 11 side, which is connected with the lower end portion of the back side frame 11, of the first reinforcing member 14 is joined with the joint part 35 of the first bracket 32 which is inserted into the lower end portion 31 of the first frame member 30.

A hole 36 for exposing the joint part 35 is provided in the lower end portion 31 of the first frame member 30, and the end portion of the first reinforcing member 14 is joined with the joint part 35 through the hole 36. Thus, the first reinforcing member 14 is joined with the first bracket 32 which receives the load applied to the back side frame 11, so as to effectively inhibit the bending and the twisting of the back side frame 11 caused by the load applied to the back side frame 11.

Preferably, the first reinforcing member 14 is arranged to pass through the joint part 35 of the first bracket 32 and the first frame member 30, and is further joined with the outer plate 33 of the first frame member 30. Accordingly, it is possible to inhibit more effectively the bending and the twisting of the back side frame 11 caused by the load applied to the back side frame 11.

Also preferably, the first reinforcing member 14 and the second reinforcing member 15 are joined in the front position from the center of the back side frame 11 in the seat front/rear direction. In the bending of the back side frame 11 based on the load, the front position of the back side frame 11 is compressed, and the rear position of the back side frame 11 is stretched. As for the buckling occurring with the compressed front position of the back side frame 11 as a base point, the buckling can be inhibited effectively when the front position is supported by the first reinforcing member 14 and the second reinforcing member 15.

On the other hand, the respective end portions of the first reinforcing member 14 and the second reinforcing member 15 on the back side frame 12 side are joined with the second frame member 40 having a hollow and closed sectional shape. The bending and the twisting of the back side frame 11 can be inhibited further when the load dispersed to the back side frame 12 through the first reinforcing member 14 and the second reinforcing member 15 is received by the second frame member 40 having a hollow and closed sectional shape.

Herein, for example, similarly to the first frame member 30 of the back side frame 11, in the second frame member 40, the cross section may be formed be a hollow and closed cross sectional shape by joining two plates having an almost U shaped hollow and open cross sectional shape. However, in this example, the second frame member 40 has a hollow and closed sectional shape by using a pipe member. The pipe member is limited to a relatively simple shape, but compared to the member having a hollow and closed cross sectional shape by joining two plates, generally, the same strength is obtained with reduction in size and weight.

Figure 6:
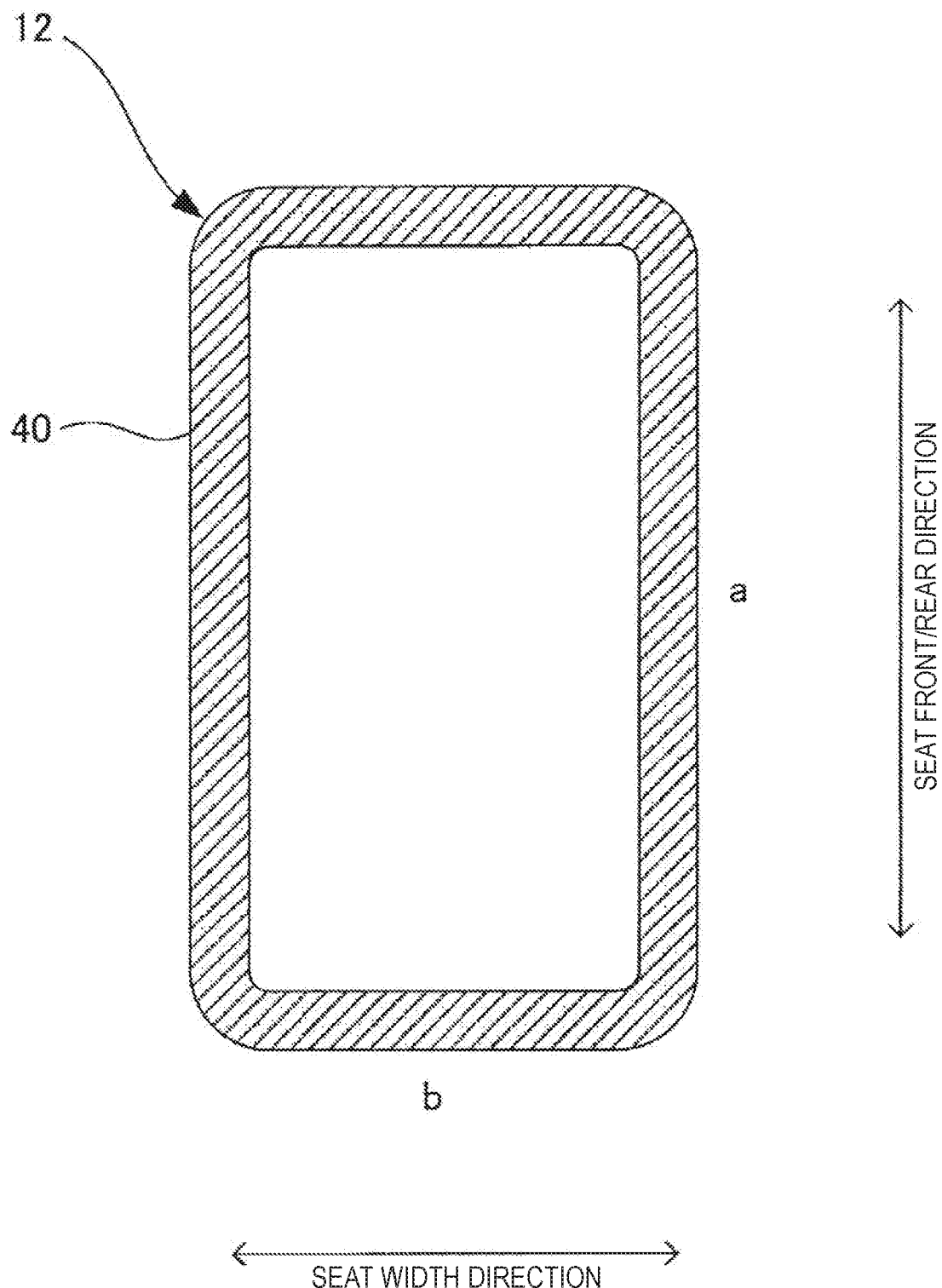
FIG. 6 is a sectional view taken along line VI-VI of FIG. 2.

As illustrated in FIG. 6, preferably, the second frame member 40 is made of a square pipe member. More preferably, the square pipe member is a square pipe member having an almost rectangular sectional shape, including a long side a arranged in parallel to the seat front-rear direction, and a short side b arranged in parallel to the seat width direction. For example, compared to a round pipe member which has the same cross sectional area and the same thickness, the square pipe member has high strength with respect to the bending, and the strength can be improved further when the long side is arranged in parallel to the seat front/rear direction substantially matching with the bending direction.

Hereinbefore, the invention is described by using the seat mounted in the vehicle such as an automobile as an example. However, the invention is not limited to the seat mounted in the vehicle and may be also applied to a vehicle seat mounted in another form of vehicle, such as an airplane and a ship, other than the vehicle.

As described above, a vehicle seat disclosed in this specification includes a seat back which is connected with a seat cushion through a recliner, in which an outlet of a shoulder belt is provided in one shoulder. The seat back includes a first side frame which is arranged on the one shoulder side and a second side frame which is arranged on the other shoulder side. The first side frame includes a first frame member having a hollow and closed sectional shape, and a plate-shaped bracket which is attached in the recliner. The bracket includes a joint part which is inserted into a lower end portion of the first frame member and is joined with the lower end portion.

In the vehicle seat disclosed in this specification, the joint part of the bracket is joined with the lower end portion of the first frame member along a side wall of the first frame member on the second side frame side, and the recliner is attached in a side surface of the bracket on an opposite side to the second side frame side.

In the vehicle seat disclosed in this specification, the second side frame includes a second frame member having a hollow and closed sectional shape, and the seat back further includes one or more reinforcing member which connects the first side frame and the second frame member.

In the vehicle seat disclosed in this specification, the second frame member is made of a square pipe member.

In the vehicle seat disclosed in this specification, a hole for exposing the joint part of the bracket is provided in the side wall of the first frame member on the second side frame side, and at least one reinforcing member passes through the hole to be joined with the joint part of the bracket.

In the vehicle seat disclosed in this specification, the reinforcing member which is joined with the joint part of the bracket is arranged to pass through the joint part and the first frame member, and is further joined with a side wall of the first frame member on an opposite side to the second side frame side.

What is claimed is:

1. A vehicle seat comprising:
   a seat back, connected with a seat cushion through a recliner, an outlet of a shoulder belt being provided in one shoulder of the seat back, wherein:
   the seat back includes: a first side frame, arranged on the one shoulder side; and a second side frame, arranged on the other shoulder side;
   the first side frame includes: a first frame member having a hollow and closed sectional shape; and a plate-shaped bracket which is attached in the recliner; and
   the bracket includes a joint part which is inserted into a lower end portion of the first frame member and is joined with the lower end portion.

2. The vehicle seat according to claim 1, wherein:
   the joint part of the bracket is joined with the lower end portion of the first frame member along a side wall of the first frame member on the second side frame side; and
   the recliner is attached in a side surface of the bracket on an opposite side to the second side frame side.

3. The vehicle seat according to claim 1, wherein:
   the second side frame includes a second frame member having a hollow and closed sectional shape; and the seat back further includes one or more reinforcing member which connects the first side frame and the second frame member.

4. The vehicle seat according to claim 3, wherein the second frame member includes a square pipe member.

5. The vehicle seat according to claim 3, wherein:
a hole, for exposing the joint part of the bracket, is provided in the side wall of the first frame member on the second side frame side; and
at least one reinforcing member passes through the hole to be joined with the joint part of the bracket.

6. The vehicle seat according to claim 5, wherein the reinforcing member, joined with the joint part of the bracket, is arranged to pass through the joint part and the first frame member, and is further joined with a side wall of the first frame member on an opposite side to the second side frame side.

* * * * *